(12) United States Patent
Dean, Jr. et al.

(10) Patent No.: US 8,620,123 B2
(45) Date of Patent: Dec. 31, 2013

(54) VISUAL TRACER SYSTEM FOR FIBER OPTIC CABLE

(75) Inventors: David L. Dean, Jr., Hickory, NC (US); William C. Hurley, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/431,565

(22) Filed: Mar. 27, 2012

(65) Prior Publication Data

US 2013/0209045 A1     Aug. 15, 2013

Related U.S. Application Data

(60) Provisional application No. 61/597,917, filed on Feb. 13, 2012.

(51) Int. Cl.
   *G02B 6/44*     (2006.01)
   *G02B 6/00*     (2006.01)

(52) U.S. Cl.
   USPC ........... 385/102; 385/100; 385/114; 385/134; 385/147

(58) Field of Classification Search
   None
   See application file for complete search history.

(56) References Cited

U.S. PATENT DOCUMENTS

| | | | |
|---|---|---|---|
| 4,755,018 A | 7/1988 | Heng et al. | 350/96.21 |
| 4,923,274 A | 5/1990 | Dean | 350/96.21 |
| 5,040,867 A | 8/1991 | De Jong et al. | 385/60 |
| 5,206,065 A | 4/1993 | Rippingale et al. | 428/98 |
| 5,377,292 A * | 12/1994 | Bartling et al. | 385/128 |
| 5,394,496 A | 2/1995 | Caldwell et al. | 385/70 |
| 5,982,967 A * | 11/1999 | Mathis et al. | 385/102 |
| 6,173,097 B1 | 1/2001 | Throckmorton et al. | 385/59 |
| 6,257,750 B1 * | 7/2001 | Strasser et al. | 362/559 |
| 6,317,553 B1 * | 11/2001 | Harper et al. | 385/128 |
| 6,347,172 B1 * | 2/2002 | Keller et al. | 385/102 |
| 6,379,054 B2 | 4/2002 | Throckmorton et al. | 385/66 |
| 6,439,780 B1 | 8/2002 | Mudd et al. | 385/83 |
| 6,606,431 B2 * | 8/2003 | Unsworth | 385/31 |
| 6,678,449 B2 * | 1/2004 | Thompson et al. | 385/114 |
| 6,695,491 B1 | 2/2004 | Leeman et al. | 385/87 |
| 6,798,956 B2 * | 9/2004 | Morrison | 385/100 |
| 6,816,661 B1 | 11/2004 | Barnes et al. | 385/134 |

(Continued)

FOREIGN PATENT DOCUMENTS

| | | | | |
|---|---|---|---|---|
| CN | 201429706 Y | 3/2010 | | G01V 3/00 |
| DE | 102007025494 A1 | 12/2008 | | G01V 3/12 |

(Continued)

OTHER PUBLICATIONS

"Side Emitting Super Glowing Fiber." MeshTel.com. MeshTel-INTELITE, Inc., 1996-2012. Web. Aug. 1, 2013.*

(Continued)

*Primary Examiner* — Rhonda Peace
(74) *Attorney, Agent, or Firm* — Russell S. Magaziner (57) ABSTRACT

A fiber optic cable includes a first optical fiber, a jacket, and a second optical fiber. The first optical fiber includes a glass core and cladding. The glass core is configured to provide controlled transmission of light through the fiber optic cable for high-speed data communication. The jacket has an interior surface that defines a conduit through which the first optical fiber extends. The jacket further has an exterior surface that defines the outside of the fiber optic cable. The second optical fiber is integrated with the exterior surface of the jacket.

13 Claims, 10 Drawing Sheets

(56) References Cited

U.S. PATENT DOCUMENTS

| | | | |
|---|---|---|---|
| 6,823,120 B2 * | 11/2004 | Hurley et al. | 385/112 |
| 6,933,438 B1 | 8/2005 | Watts et al. | 174/48 |
| 7,029,137 B2 | 4/2006 | Lionetti et al. | 362/84 |
| 7,221,284 B2 | 5/2007 | Scherer et al. | 340/815.45 |
| 7,401,961 B2 * | 7/2008 | Longatti et al. | 362/551 |
| 7,603,020 B1 | 10/2009 | Wakileh et al. | 385/136 |
| 7,748,860 B2 | 7/2010 | Brunet | 362/84 |
| 7,920,764 B2 * | 4/2011 | Kewitsch | 385/101 |
| 7,948,226 B2 | 5/2011 | Rathbun, II et al. | 324/66 |
| 8,150,227 B2 * | 4/2012 | Kewitsch | 385/101 |
| 8,322,871 B1 * | 12/2012 | Knaggs et al. | 362/84 |
| 2001/0048797 A1 * | 12/2001 | Van Dijk et al. | 385/114 |
| 2003/0016924 A1 * | 1/2003 | Thompson et al. | 385/114 |
| 2004/0022504 A1 * | 2/2004 | Hurley et al. | 385/109 |
| 2004/0146254 A1 * | 7/2004 | Morrison | 385/100 |
| 2004/0160774 A1 | 8/2004 | Lionetti et al. | 362/253 |
| 2006/0232385 A1 | 10/2006 | Scherer et al. | 340/286.02 |
| 2008/0273844 A1 * | 11/2008 | Kewitsch | 385/101 |
| 2011/0122646 A1 | 5/2011 | Bickham et al. | 362/554 |
| 2011/0150488 A1 | 6/2011 | Kewitsch | 398/116 |
| 2011/0305035 A1 | 12/2011 | Bickham et al. | 362/558 |

FOREIGN PATENT DOCUMENTS

| | | | |
|---|---|---|---|
| EP | 1168025 A2 | 2/2002 | |
| GB | 2260198 A | 4/1993 | G01R 31/02 |
| GB | 2375898 A | 11/2002 | H01R 13/70 |
| WO | WO2006/113114 A2 | 10/2006 | G08B 9/00 |
| WO | WO2006/113114 A3 | 10/2006 | G08B 9/00 |

OTHER PUBLICATIONS

"Super Vision Fiber Optic Side Glow Cables." TriNorthLighting.com. Tri North Lighting, Inc., n. d. Web. Aug. 1, 2013.*
"Specifications of Ouf Fiber and Cable." N.p., n.d. Web. Sep. 8, 2013.
M. Rajesh, Fabrication and Charaterisation, Polymer Photonics: An Overview, 2011.
Schott Spectra Stream Glass Harness, 2 pages, Rev. Nov. 2006.
Spigulis, Jane, "Side Emitting Fibers Brighten Our World", Oct. 2005, www.osa-opn.org, 6 pages.
International Search Report for HI12-017, Aug. 22, 2013, 38 pages.

* cited by examiner

VISUAL TRACER SYSTEM FOR FIBER OPTIC CABLE

CROSS REFERENCE

This application claims the benefit of priority under 35 U.S.C. §119 of U.S. Provisional Application Ser. No. 61/597,917 filed on Feb. 13, 2012, the content of which is relied upon and incorporated herein by reference in its entirety.

BACKGROUND

The present invention relates generally to a visual tracer system for a cable, such as a data-transmission cable, electrical cable, fiber optic cable, etc.

Figure 1:
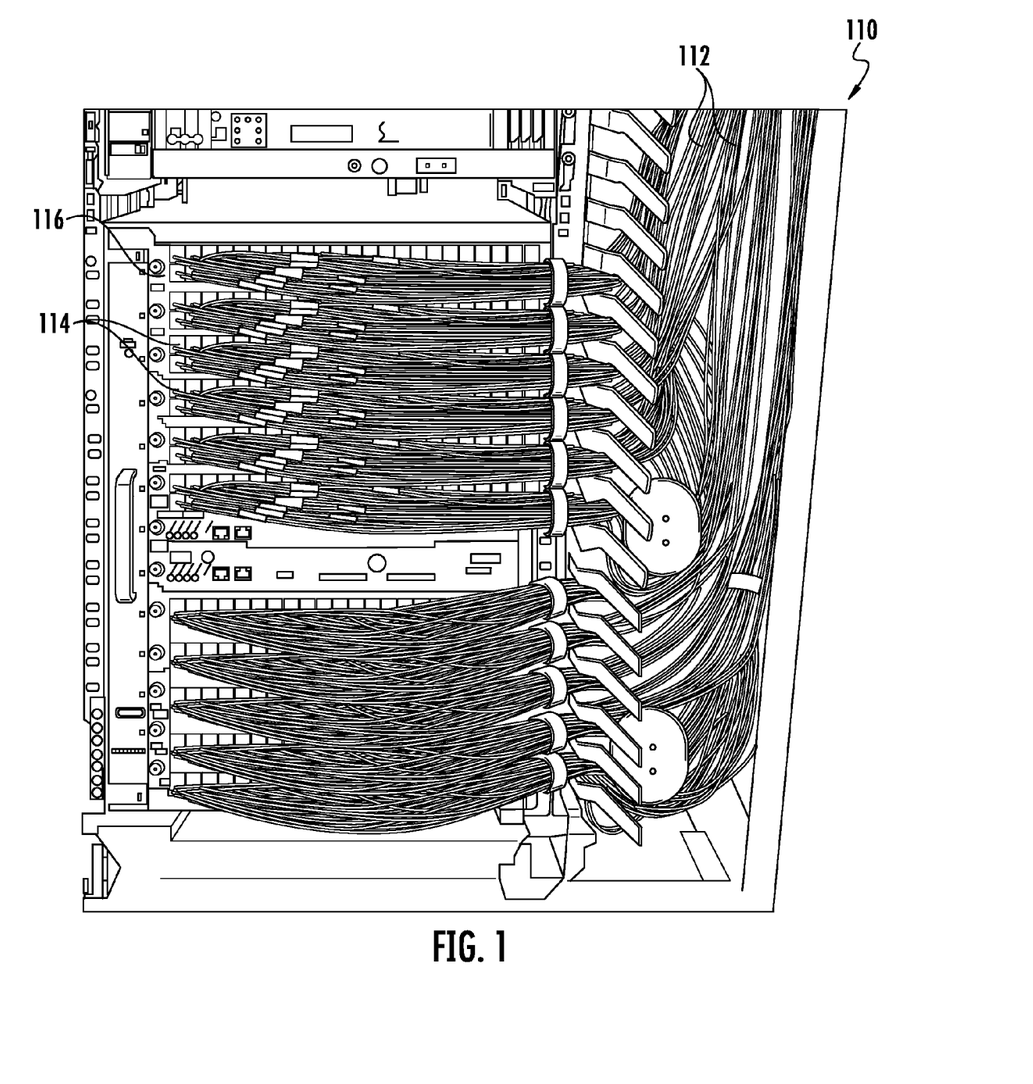
FIG. 1 is a perspective view of an equipment rack supporting fiber optic cables.
Figure 2:
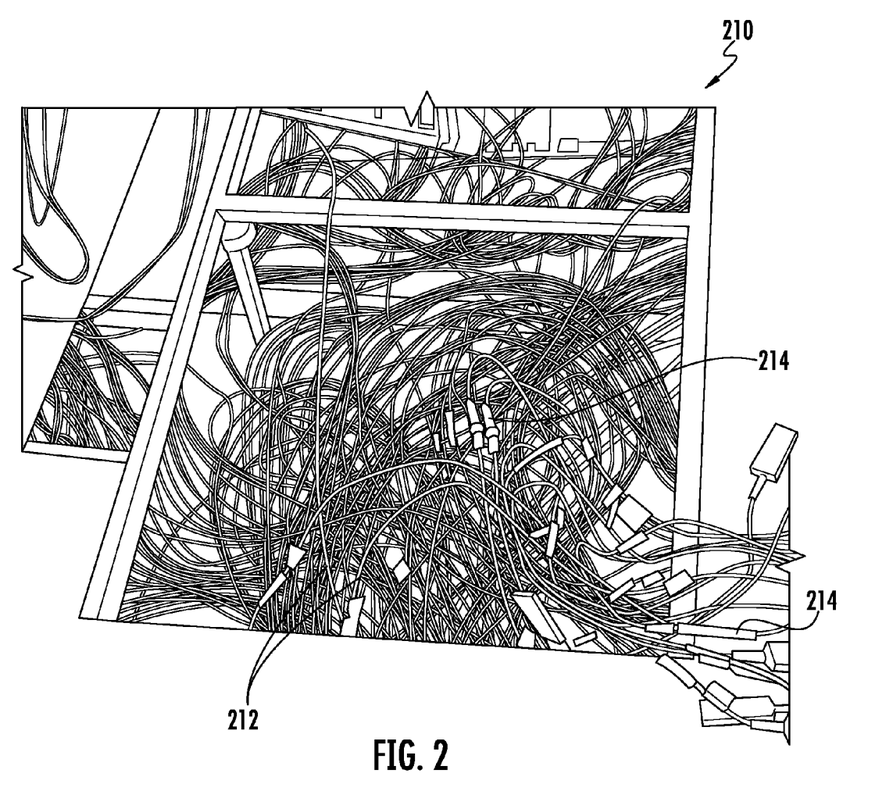
FIG. 2 is a perspective view of an under-floor cable tray supporting fiber optic cables.

Fiber optic cable assemblies may range in size and complexity from single-fiber jumpers to multi-fiber harnesses. These cable assemblies are typically used to interconnect equipment in high-speed networks. A common problem in these networks is congestion and clutter caused by large quantities of the cables. FIG. 1 shows an example of congestion in an equipment rack 110. FIG. 2 shows congestion in an under-floor cable tray 210. Network operators frequently desire to change optical connections to accommodate moves, adds, and changes in the network. However, such congestion makes it difficult to trace a particular assembly from the source to the receiver, which may be required to perform the moves, adds, and changes in the network. Other types of cables may have similar problems.

Some systems to visually trace individual cables in congested areas of cables include light-emitting diode (LED) tracks that extend along the length of the individual cable that, when activated, produce light that may be used to identify the particular cable. However, such systems may be cumbersome to manufacture and use. For example, the LED system may need to be separately installed after extrusion of the cable, requiring additional manufacturing steps. Also, the LED system may require a supplemental power system and controls, such as activation features integrated with a specialized connector for the optical fiber cable, which increase the costs and complexity of manufacturing and using such LED systems.

A need exists for a system to visually trace an optical fiber cable, such as a particular one in a congested arrangement of many optical fiber cables, where the associated cable can be quickly and efficiently manufactured, requires fewer auxiliary components to operate, and/or can be integrated with existing high-speed network or data center hardware.

SUMMARY

One embodiment relates to a fiber optic cable, which includes a first optical fiber, a jacket, and a second optical fiber. The first optical fiber includes a glass core and cladding. The glass core is configured to provide controlled transmission of light through the fiber optic cable for high-speed data communication. The jacket has an interior surface that defines a conduit through which the first optical fiber extends. The jacket further has an exterior surface that defines the outside of the fiber optic cable. The second optical fiber is integrated with the exterior surface of the jacket.

Another embodiment relates to a jacket for a cable. The jacket includes an interior surface, an exterior surface, and an optical fiber. The interior surface defines a conduit configured to house a transmission element. The optical fiber is integrated with the exterior surface of the jacket. Further, the optical fiber is configured to release, along a length of the optical fiber, at least some of light passed through the optical fiber such that the released light is visible along the exterior surface of the jacket, thereby providing a visual trace.

Yet another embodiment relates to a method of manufacturing a cable. The method includes steps of extruding a jacket and integrating an optical fiber with an exterior of the jacket. The optical fiber is configured to release, along a length of the optical fiber, at least some of light passed through the optical fiber such that the released light is visible along the exterior surface of the jacket, thereby providing a visual trace.

Additional features and advantages will be set forth in the Detailed Description which follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Before turning to the figures, which illustrate the exemplary embodiments in detail, it should be understood that the present invention is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 14:
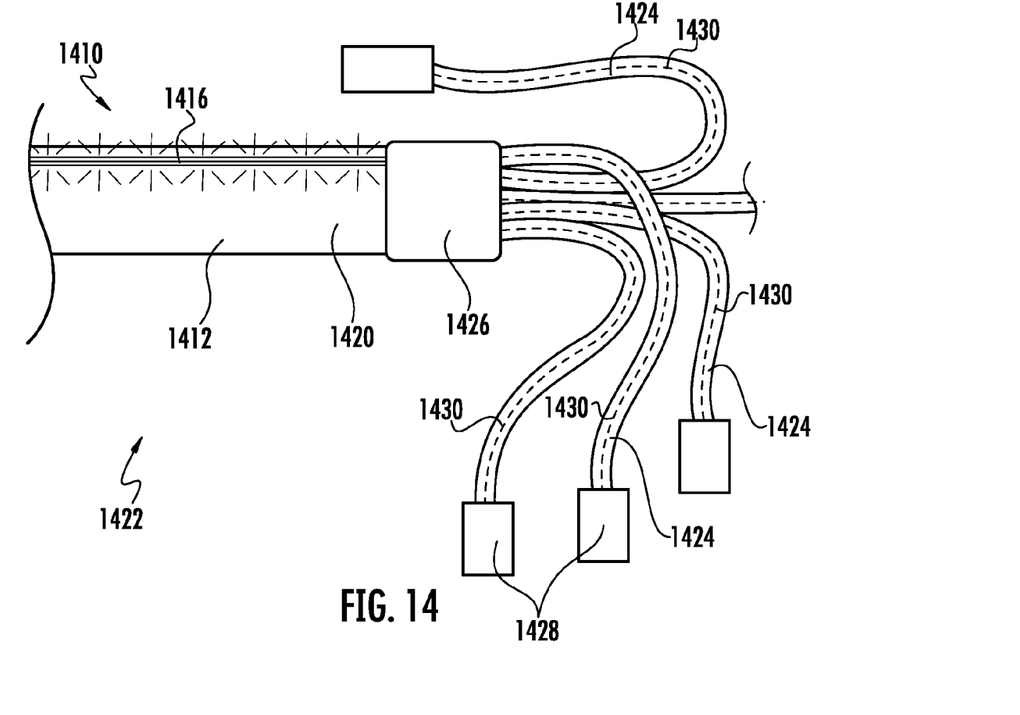

Referring now to FIGS. 1-2, the equipment rack 110 and the under-floor cable tray 210 include large numbers of fiber optic cables 112, 212, which may be legs of larger cable assembles, such as harness cable assembles (see generally harness cable assembly 1410 as shown in FIG. 14) or jumper cables extending from a trunk cable by way of a furcation body. As shown in FIGS. 1-2, the fiber optic cables 112, 212 of the assemblies have connectors 114, 214 on ends of the fiber optic cables 112, 212, and the connectors 114, 214 may be attached to hardware, such as servers 116 in the rack 110 (FIG. 1), to other cables, or elsewhere.

As discussed in the Background section, identifying individual fiber optic cables 112, 212 in the equipment rack 110 or the under-floor cable tray 210 may be difficult for a network operator during moves, adds, and changes in the network. According to an exemplary embodiment, a tracer feature may be used by the operator to locate and distinguish an individual fiber optic cable as more fully explained with regard to the exemplary embodiments shown in FIGS. 3-18. In some such embodiments, the tracer feature is built into the fiber optic cable without disturbing the form, fit, and/or function of the cable, thus avoiding a need for specialized connectors and patch panels. Further the tracer feature, in some embodiments, offers the advantage of being able to identify a specific cable anywhere along the length of the cable, as well as at the ends. In contemplated embodiments, other types of cables, such as electrical-communication wires, ropes, hydraulic-fluid lines, or other conduits may benefit from the tracer features taught and described herein.

Figure 3:
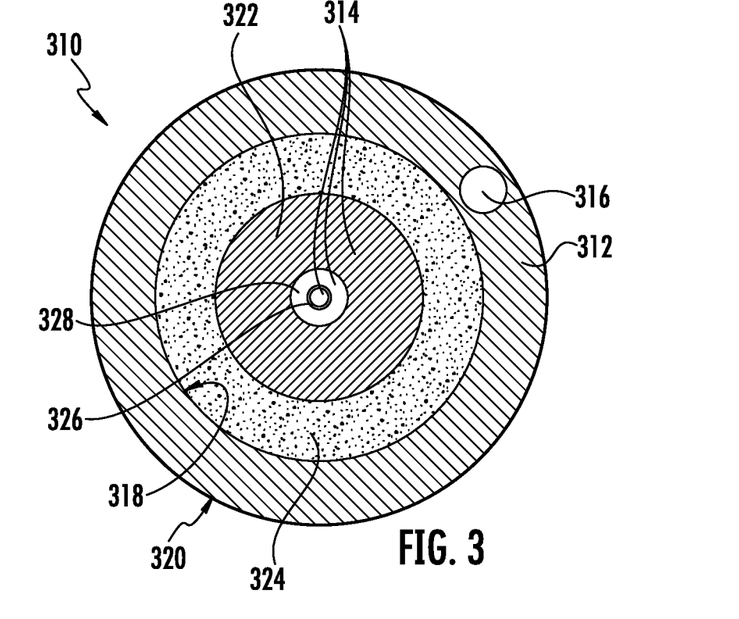
FIGS. 3-11 are sectional end views of fiber optic cables according to various exemplary embodiments.

Referring to FIG. 3, a cable (e.g., wire, rope, line, conduit), such as a fiber optic cable 310, includes a jacket 312, a transmission element in the form of a first optical fiber 314, and a tracer feature in the form of a second optical fiber 316. The jacket 312 has an interior surface 318 that defines a conduit (e.g., annular passage) and an exterior surface 320 (e.g., outside, outer portion). According to an exemplary embodiment, the first optical fiber 314 is a glass optical fiber, including a glass core 326 and cladding 328 (e.g., CLEARCURVE® single or multi-mode fibers produced by Corning Incorporated, or other commercially-available optical fibers). The core is configured to serve as a medium for controlled transmission of light through the fiber optic cable 310, such as for high-speed data communication within a network.

In some embodiments, the first optical fiber 314 is a tight-buffered optical fiber having a protective layer 322 (e.g., polymer layer) surrounding the glass core 326 and cladding 328. In other embodiments, the first optical fiber 314 may be one of a plurality of glass optical fibers in a loose-tube arrangement (see generally FIG. 9). In still other embodiments, the first optical fiber 314 may be one of several glass optical fibers arranged in parallel with one another in a ribbon of such fibers (see generally FIG. 11). A layer of strength elements 324 (e.g., aramid), rip cords, armor, water-swellable powder, and/or other features may be included within the conduit formed by the interior surface 318 of the jacket 312 or otherwise integrated with the cable 310. In contemplated embodiments, a cable as disclosed herein may contain transmission media other than optical fibers, such as copper wires, fluid, or other media.

According to an exemplary embodiment, the tracer feature, in the form of the second optical fiber 316 of the fiber optic cable 310, is integrated with (e.g., coupled to, fully or partially embedded in, mounted on, attached to) the jacket 312. More specifically, in some embodiments, the second optical fiber 316 is integrated with the exterior surface 320 of the jacket 312 such that light released laterally by the second optical fiber 316 may be visible from outside of the jacket 312, such as to the operator of the cable network for tracing of the individual optical cable 310. The amount of light released by the second optical fiber 316 is a function of the amount of light directed into the second optical fiber, the distance from the source of light, the wavelength of the light, the source of the light (e.g., laser versus LED), the materials and structure of the second optical fiber 316, and other factors. Less ambient light and a shorter cable length may improve performance of the tracer feature.

Referring specifically to FIG. 3, the second optical fiber 316 is embedded in the exterior surface 320 of the jacket 312, where only a thin portion of the jacket 312 (e.g., less than 1 mm, less than 100 µm) is positioned between the second optical fiber 316 and outside of the jacket 312. Attenuation of light from a laser or another external light source directed into the second optical fiber 316 illuminates the cable 310, causing the jacket 312 to glow from the release of light from the second optical fiber 316 through the thin portion of the jacket 312. In some embodiments, the second optical fiber 316 may be a relatively high-loss fiber, attenuating the quantity of visible light passing therethrough by more than half in a distance that is less than 10,000 times the diameter of the fiber (i.e., core, cladding, and outer coating if glass; only core if plastic; e.g., 500 µm diameter).

In other embodiments, the second optical fiber 316 is configured to transmit visible light from one end of the cable 310 to the other in order to identify which connectors (e.g., multi-fiber push-on/pull-off connectors, local connector (LC) connectors, etc.) are attached to the same cable 310, without releasing a substantial amount light (e.g., generally not detectable by a human-eye) along the length of the cable 310. In still other embodiments, some light is released by the second optical fiber 316 to provide a visible, longitudinal trace for the cable 310, while other light carried by the second optical fiber 316 is communicated completely through the second optical fiber 316 between ends of the cable 310 to identify connectors (see, e.g., connectors 114, 214 as shown in FIGS. 1-2) common to the cable 310.

According to an exemplary embodiment, the second optical fiber 316 is a plastic optical fiber (POF) having a plastic core; as opposed to the first optical fiber 314, which is a glass optical fiber. In some embodiments, the plastic of the second optical fiber 316 includes (e.g., comprises, consists essentially of, consists of) at least one of polystyrene, polycarbonate, and chlorinated acrylate. In some embodiments, the plastic of the second optical fiber 316 includes a thermoplastic material that is co-extrudable with at least one of polyvinyl chloride, polyethylene, another thermoplastic polymer, and/or another jacketing-material (e.g., low-smoke zero halogen jacket materials).

In some embodiments, the cable 310 may be manufactured by a process including extruding the jacket 312 around a transmission element (e.g., first optical fiber 314, copper wire) and integrating the second optical fiber 316 with the exterior surface 320 of the jacket 312. The jacket 312 may be extruded fully or only partially around the second optical fiber 316.

According to a preferred embodiment, the jacket 312 and the second optical fiber 316 are co-extruded. Co-extrusion of different materials in a cable jacket, forming particular shapes of the secondary material within the wall of the jacket, and other relevant teachings are provided by International Application Nos. PCT/US11/62002 filed Nov. 23, 2011, PCT/US11/57574 filed Oct. 25, 2011, and PCT/US11/34309 filed Apr. 28 2011, which are each incorporated by reference herein in their entireties. Accordingly, the second optical fiber 316 may be a plastic optical fiber having a circular cross-section that is co-extruded at least partially into an annular wall of the jacket 312, as shown in FIG. 3.

In some embodiments, the material (e.g., plastic) of the second optical fiber 316 is a single material that has a greater index of refraction than the material of the jacket 312. In some such embodiments, the second optical fiber 316 is embedded in the jacket 312, and the jacket 312 serves as cladding for a core formed by the material of the second optical fiber 316, thereby forming a step-index plastic optical fiber. In other embodiments, the second optical fiber 316 includes two different materials and/or different arrangements of the same material that form a core surrounded by cladding, which is at least partially embedded in the jacket 312 (i.e., yet another material). Such a two-layered, plastic optical fiber may be co-extruded with the jacket 312, or separately formed and otherwise coupled to the jacket 312.

In some contemplated embodiments, the second optical fiber 316, integrated with the exterior surface 320 of the jacket 312, may be a glass optical fiber. In some such embodiments, the glass optical fiber may be configured or arranged to release a relatively large amount of light along the length of the glass optical fiber, such that the light is visible along the length of the jacket 312 to provide a visible trace for the cable 310. The glass of the second optical fiber 316 may include impurities, micro-cracks, air pockets, etc. to increase attenuation of the second optical fiber 316, such as by scattering light carried by the second optical fiber 316. A lower-grade glass core material may be used. The glass of the second optical fiber 316 may have imperfections in the cladding, such as holes, scratches, etc. The cladding material may be selected to allow for a controlled amount of light released from the core. The glass of the second optical fiber 316 may be crimped or otherwise bent to increase attenuation. In some embodiments, the second optical fiber 316 (e.g., glass or POF) has at least twice the attenuation of visible light of the first optical fiber 314.

In some embodiments, the second optical fiber 316, such as a glass or plastic optical fiber, may be drawn from a payoff along a path that is exterior to the extruder, and then pressed into the jacket 312 before the jacket fully hardens (i.e., cools) from the extrusion process. In still other embodiments, the second optical fiber 316 may be glued, taped, or otherwise fastened to the jacket 312.

Referring generally to FIGS. 4-16, various forms of cables, shown as cables 410, 510, 610, 710, 810, 910, 1010, 1110, 1210, 1310, 1410, 1510, 1610, each include a jacket 412, 512, 612, 712, 812, 912, 1012, 1112, 1212, 1312, 1412, 1512, 1612, a first optical fiber 414, 514, 614, 714, 814, 914, 1014, 1114, 1514, 1614, and a second optical fiber 416, 516, 616, 716, 816, 916, 1016, 1116, 1216, 1316, 1416, 1516, 1616. According to exemplary embodiments, the first optical fiber 414, 514, 614, 714, 814, 914, 1014, 1114, 1514, 1614 includes a glass core and cladding (see, e.g., glass core 326 and cladding 328 as shown in FIG. 3), where the glass core is configured to provide controlled transmission of light through the respective fiber optic cable 410, 510, 610, 710, 810, 910, 1010, 1110, 1210, 1310, 1410, 1510, 1610 for high-speed data communication. The jacket 412, 512, 612, 712, 812, 912, 1012, 1112, 1212, 1312, 1412, 1512, 1612 has an interior surface 418, 518, 618, 718, 818, 918, 1018, 1118, 1518, 1618 that defines a conduit through which the first optical fiber 414, 514, 614, 714, 814, 914, 1014, 1114, 1514, 1614 extends, and further has an exterior surface 420, 520, 620, 720, 820, 920, 1020, 1120, 1220, 1320, 1420, 1520, 1620 that defines the outside of the respective fiber optic cable 410, 510, 610, 710, 810, 910, 1010, 1110, 1210, 1310, 1410, 1510, 1610. The second optical fiber 416, 516, 616, 716, 816, 916, 1016, 1116, 1216, 1316, 1416, 1516, 1616 is integrated with the exterior surface 420, 520, 620, 720, 820, 920, 1020, 1120, 1220, 1320, 1420, 1520, 1620 of the respective jacket 412, 512, 612, 712, 812, 912, 1012, 1112, 1212, 1312, 1412, 1512, 1612, as shown in FIGS. 4-16.

Figure 4:
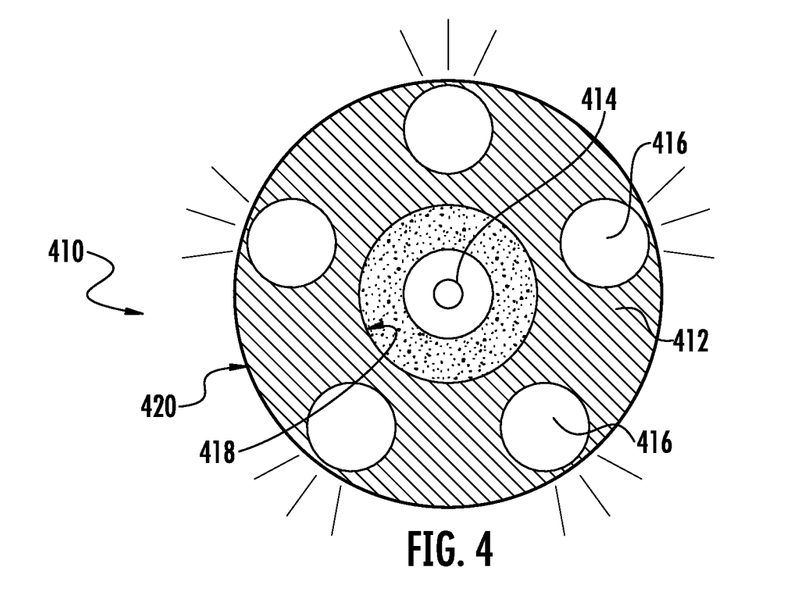

Referring more specifically to FIG. 4, the fiber optic cable 410 includes a plurality of optical fibers 416 at least partially embedded in the jacket 412. In some embodiments, the optical fibers 416 are uniformly distributed radially around the jacket 412, such as three or more optical fibers 416 that also extend longitudinally along the length of the jacket 412. Use of three or more evenly spaced optical fibers 416 that are at least partially embedded in the jacket 412 is intended to ensure that at least one of the optical fibers 416 is in a relatively good visible position when viewing the cable in any orientation, such as when all of the plurality of optical fibers 416 are releasing light that is visible longitudinally along the length of the jacket 412.

Figure 5:
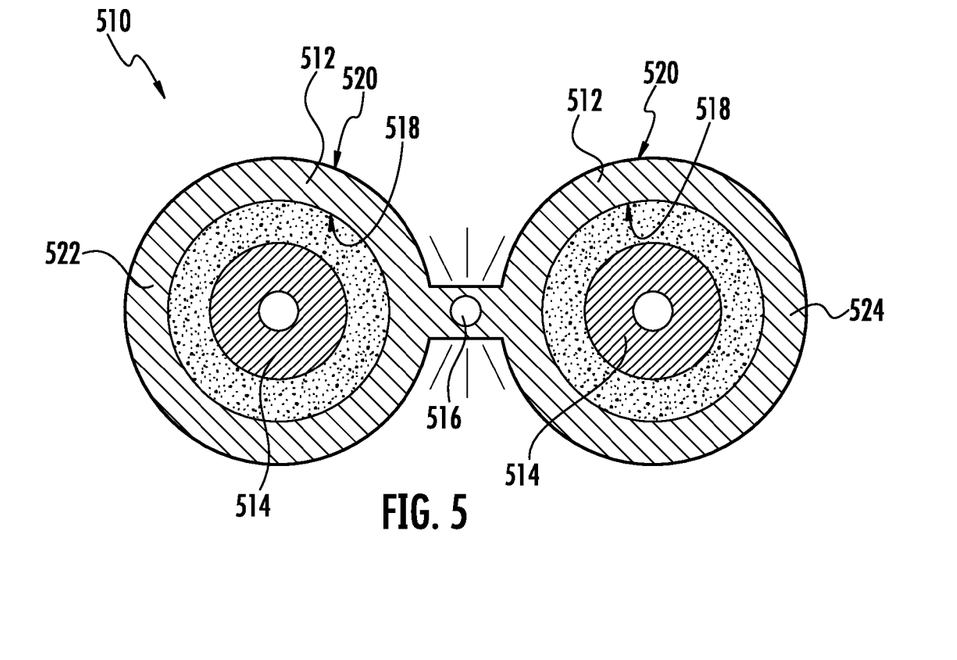

Referring to FIG. 5, the fiber optic cable 510 includes two sub-units 522, 524 connected by a central webbing 526 of the jacket 512. Each of the sub-units 522, 524 includes a portion of the jacket 512 and contains the first optical fibers 514, which may be a glass optical fiber configured for high-speed data transmission. According to an exemplary embodiment, the second optical fiber 516 of the fiber optic cable 510 is embedded in the webbing connecting the sub-units. In some such embodiments, the second optical fiber 516 is visible from either side of the webbing 526 (e.g., top or bottom) when releasing light to serve as a visual trace of the cable 510. Locating the second optical fiber 516 in the webbing 526 portion of the jacket 512 allows for the same optical fiber 516 to provide a visual trace on both sides of the cable 510. In other embodiments, other or additional optical fibers 516 are embedded elsewhere in the jacket 512, similar to the embodiments shown in FIGS. 3-4 and 6-10.

Figure 6:
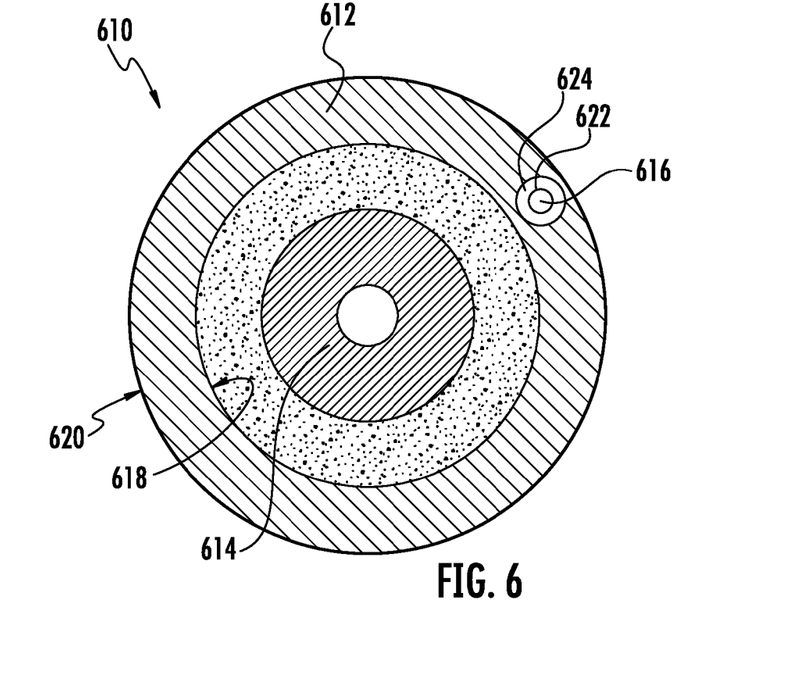

Referring to FIG. 6, the fiber optic cable 610 includes the second optical fiber 616, which has both a core 622 and a cladding 624. In some embodiments, the second optical fiber 616 is a glass optical fiber that is drawn through the extruder and embedded in the jacket 612 during manufacturing of the cable 610. In other embodiments, the second optical fiber 616 is a plastic optical fiber that is co-extruded with the jacket 612, or is otherwise coupled to the jacket 612. In some embodiments, the second optical fiber 616 is configured to communicate visible light from one end of the cable 610 to the other in order to indicate which cable ends are part of the same cable 610. In some embodiments, the second optical fiber 616 is otherwise or further configured to release visible light along the length of the cable 610, such as from the core 622 laterally outward, through or past the cladding 624.

Figure 7:
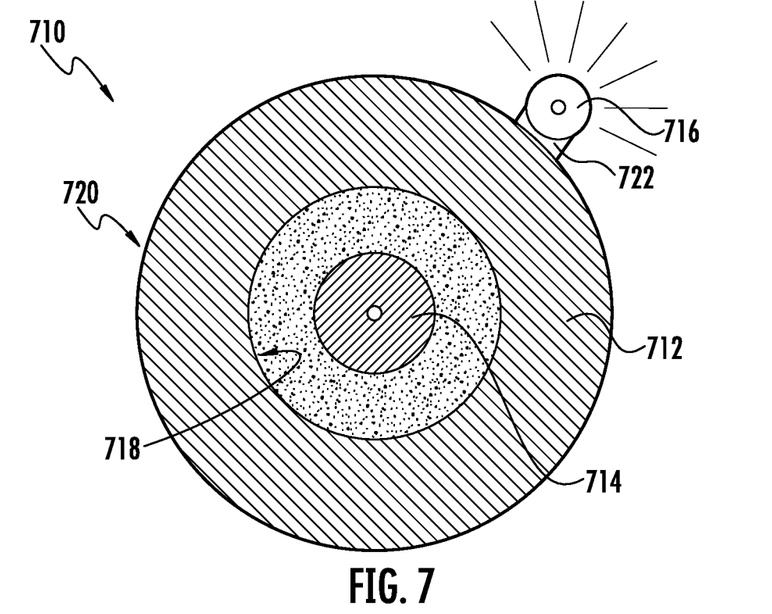

Referring to FIG. 7, the fiber optic cable 710 includes the second optical fiber 716 fastened to the exterior surface 720 of the cable 710. In some embodiments, an adhesive 722 is used to glue the second optical fiber 716 to the exterior surface 720. In other embodiments, the tape, clips, or other fasteners are used. In some embodiments, a combination of fasteners are used, such as glue between the second optical fiber 716 and the exterior surface 720 of the jacket 712, and clear tape over the top of the second optical fiber 716 to further secure the second optical fiber 716 to the exterior surface 720 of the jacket 712 of the fiber optic cable 710. The second optical fiber 716 may be fastened to the exterior surface of the cable as part of an assembly line that includes an extruder for forming the jacket. In other embodiments, the second optical fiber may be fastened to the exterior surface of a section (e.g., 10-meter section) of cable cut from a larger cable (e.g., hundreds of meters on a reel), where the section is being prepared as a specialized cable for a data center, such as a jumper cable.

Figure 8:
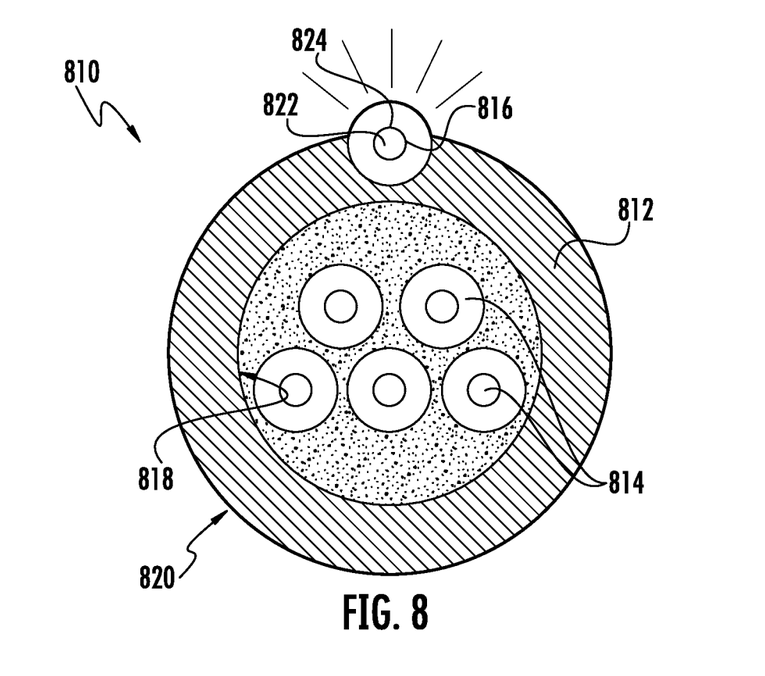

Referring to FIG. 8, the fiber optic cable 810 includes the second optical fiber 816 partially embedded in the exterior surface 820 of the jacket 812. At least a portion of the second optical fiber 816 is directly exposed to outside of the fiber optic cable 810 (e.g., exposed to atmosphere, along outermost periphery of the cable 810). In some such embodiments, the second optical fiber 816 is co-extruded with the material of the jacket 812, and includes a core 822 and cladding 824. In other such embodiments, the second optical fiber 816 is drawn from a payoff and is pressed into the exterior surface 820 of the jacket 812. The second optical fiber 816 may include a coating to improve adhesion to the jacket. According to an exemplary embodiment, the second optical fiber (e.g., POF) is extruded such that the second optical fiber 816 is produced as a bump or raised section on the jacket 812, which may increase the visibility of the tracer feature.

Figure 9:
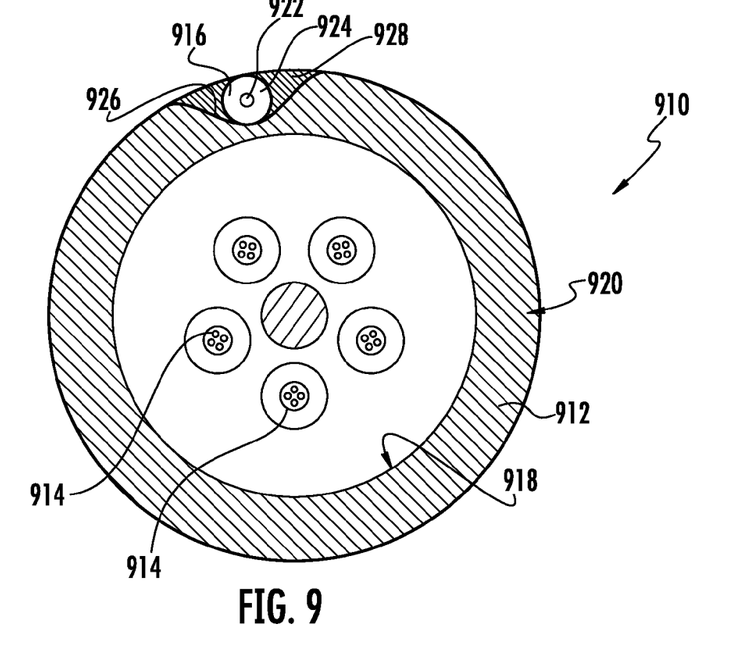

Referring to FIG. 9, the fiber optic cable 910 includes the second optical fiber 916 integrated with the exterior surface 920 of the jacket 912. According to an exemplary embodiment, the second optical fiber 916 includes a core 922 and cladding 924, and is configured to release light directed through the core 922 laterally along the length of the second optical fiber 916. The second optical fiber 916 is located in a notch 926 (e.g., well, channel, groove) in the exterior surface 920, and is secured therein with a translucent (e.g., clear, semi-clear) material 928 (e.g., thermoplastic). Use of the translucent material 928 allows light released from the second optical fiber 916 to provide a visible trace for the cable 910, while maintaining a round exterior shape of the cable 910 and providing some wear-resistant shielding to the second optical fiber 916.

In some embodiments, the core 922, the cladding 924, the translucent material 928, and the jacket 912 are co-extruded around the first optical fibers 914 and other components of the fiber optic cable 910. In other embodiments, the jacket 912 and translucent material 928 are co-extruded around the second optical fiber 916, which is drawn from a payoff and passed through the extruder during manufacturing of the cable 910. In still other embodiments, the second optical fiber 916 and the translucent material 928 are attached to the jacket 912 following manufacturing of the rest of the cable 910.

Figure 10:
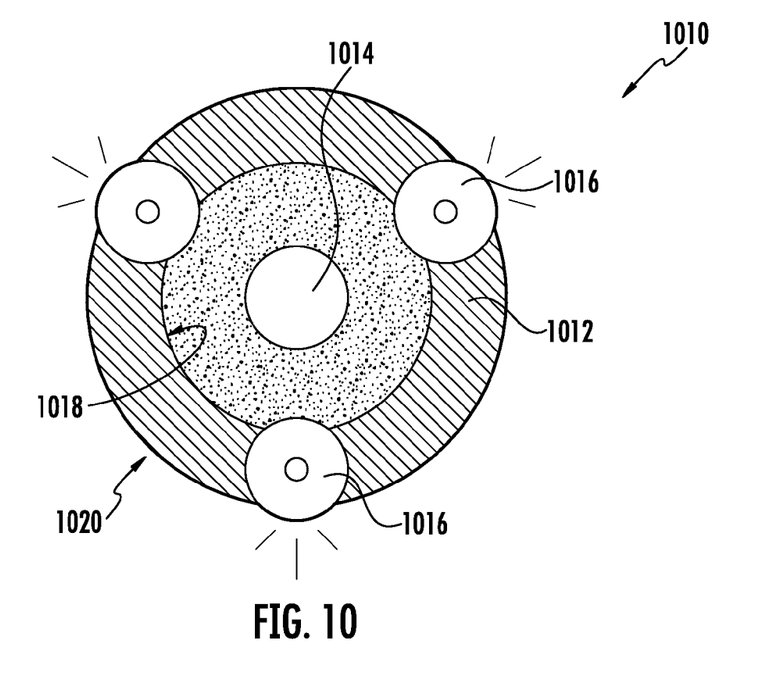
Figure 11:
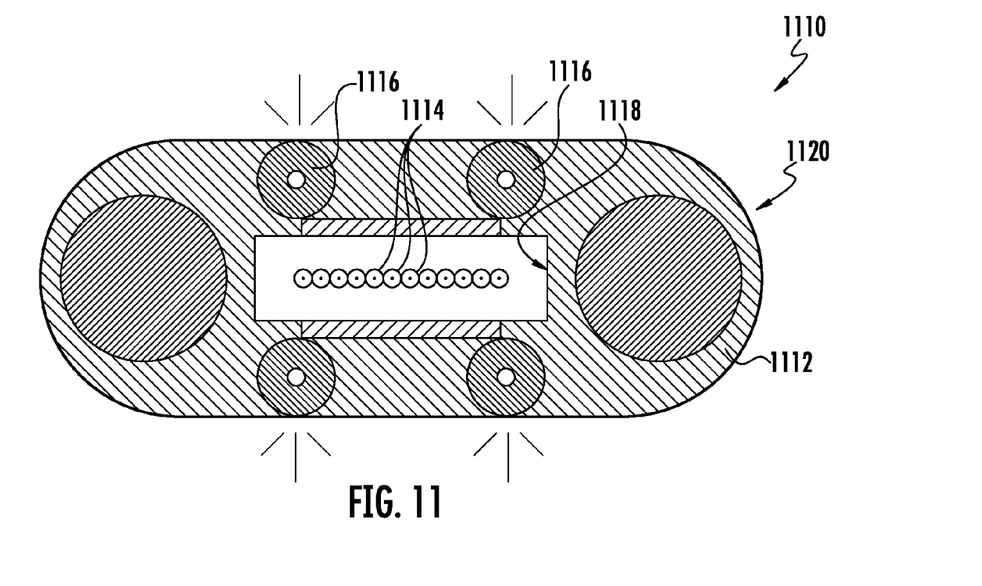

Referring to FIGS. 10-11, the fiber optic cables 1010, 1110 include the second optical fibers 1016, 1116, which span or mostly span the width of the jacket 1012, 1112, between the exterior surface 1020, 1120 and the interior surface 1018, 1118. In some embodiments, the jacket 1012, 1112 extends over the second optical fibers 1016, 1116 on either or both of the exterior surface 1020, 1120 and the interior surface 1018, 1118, providing a separation of less than 1 mm, such as less than 100 µm between the second optical fiber 1016, 1116 and area outside of or interior to the jacket 1012, 1112.

According to an exemplary embodiment, in addition to providing a visual trace of the cable 1010, 1110, the second optical fiber 1016, 1116 may serve as a tearing point or guide line for removing a portion of the jacket 1012, 1112 (e.g., a flap of the jacket 1012, 1112) to access components within the conduit defined by the interior surface 1018, 1118 of the jacket 1012, 1112, such as the first optical fibers 1014, 1114. Such an access system is further discussed in International Application Nos. PCT/US11/62002, PCT/US11/57574, and PCT/US11/34309, incorporated herein above.

Figure 12:
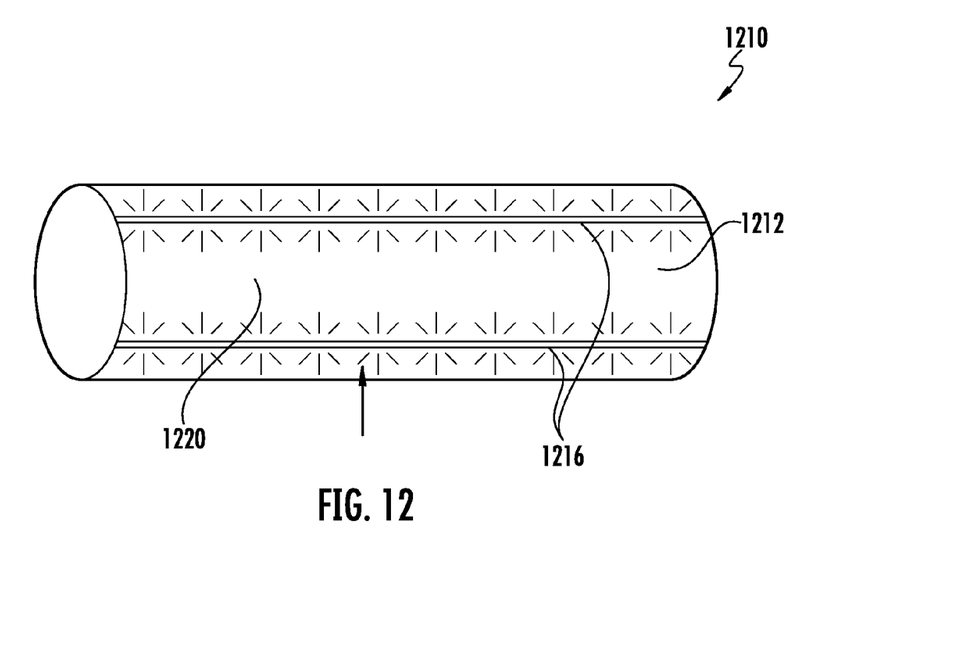
FIGS. 12-14 are side views of fiber optic cables according to various exemplary embodiments.

Referring to FIG. 12, the fiber optic cable 1210 includes the second optical fibers 1216 integrated with the exterior surface 1220 of the jacket 1212. Together the optical fibers 1216 form a visible tracer feature that, when light is directed along the optical fibers 1216, highlight at least a portion of the path of the cable 1210, such as through a congested pile of cables. As discussed with regard to the fiber optic cables 1010, 1110 shown in FIGS. 10-11, the optical fibers 1216 integrated in the exterior 1220 of the jacket 1212 may serve as tearing guides or rip cords to facilitate opening the jacket 1212 in a controlled and efficient manner to access interior components of the fiber optic cable 1210.

According to an exemplary embodiment, the fiber optic cable 1210 includes at least two optical fibers 1216 integrated with the exterior surface 1220 of the jacket 1212, which together serve to facilitate tearing of a portion of the jacket 1212. In some such embodiments, the two optical fibers 1216 are generally parallel with one another and are spaced apart from one another on the lateral periphery of the jacket 1212 by at least 15-percent of the length (e.g., circumference) of the periphery, such as at least 30-percent or about 50-percent.

Figure 13:
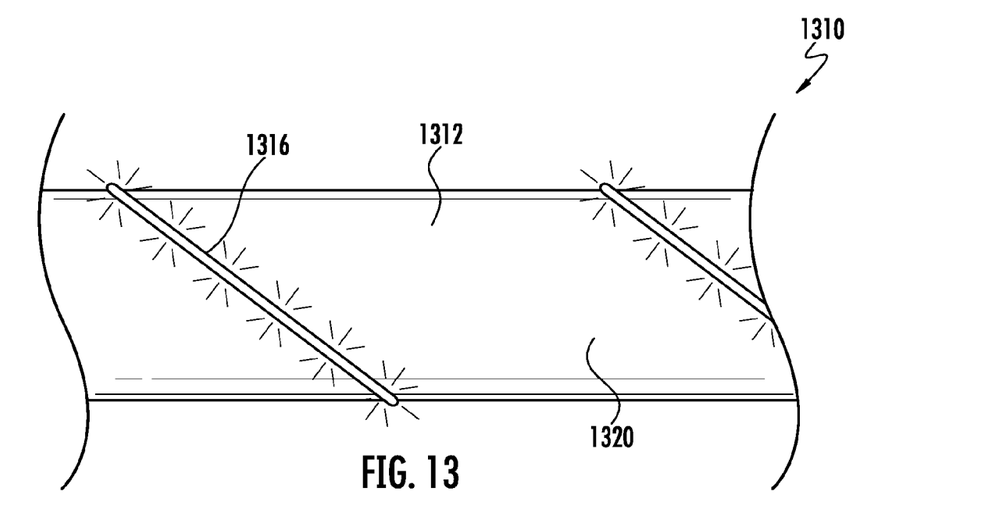

Referring now to FIG. 13, the fiber optic cable 1310 includes the second optical fiber 1316, which is helically wound or positioned and integrated with the exterior surface 1320 of the jacket 1312. Helically positioning the optical fiber 1316 allows a single one of the optical fibers 1316 to be viewable regardless of any particular orientation of the cable 1310. Furthermore, helically positioning the optical fiber 1316 may reduce stresses on the optical fiber 1316 when the cable 1310 bends.

In some embodiments, the second optical fiber 1316 is attached to the jacket 1312 following extrusion of the jacket 1312, such as with an adhesive. In other contemplated embodiments, the second optical fiber 1316 is extruded into or co-extruded with the jacket 1312 by including a rotating feeder, extrusion head, or nozzle for distributing the material of the second optical fiber 1316. Two or more optical fibers 1316 may be helically placed around the exterior surface 1320 of the jacket 1312. The optical fibers 1316 may be wound in the same direction or counter-helically wound to crisscross one another.

Referring to FIG. 14, the fiber optic cable 1410 is a trunk cable of a cable assembly in the form of a harness cable assembly 1422, which supports a plurality of sub-units in the form of individual cable legs 1424. The cable legs 1424 each support sub-sets of the optical fibers or other transmission elements extending through the conduit formed by the interior surface of the jacket 1412 of the fiber optic cable 1410. In some embodiments, the legs 1424 include furcation tubes separately attached to the internal optical fibers of the fiber optic cable 1410 and joined thereto by a furcation body, such as a furcation plug 1426. In other embodiments, the legs 1424 are extensions of micro-modules that also extend through the trunk cable 1410. According to an exemplary embodiment, the legs 1424 include connectors 1428 (e.g., LC connectors) attached to distal ends of the legs 1424.

According to an exemplary embodiment, some or all of the legs 1424 include optical fibers 1430 (e.g., plastic optical fibers) integrated with exterior surfaces of the legs 1424, similar to the second optical fiber 1416 integrated with the exterior surface 1420 of the fiber optic cable 1410. In some embodiments, the optical fibers 1430 integrated with the exterior surfaces of the legs 1424 are not coupled to the second optical fiber 1416 of the fiber optic cable 1410.

In contemplated embodiments, the optical fibers 1430 integrated with the exterior surfaces of the legs 1424 may be coupled to the optical fiber 1416 (or fibers) of the fiber optic cable 1410 and/or to the furcation plug 1426. In some such embodiments, the optical fiber 1416 of the cable 1410 includes a bundle of smaller optical fibers 1430 which are separated and attached to (e.g., taped to) the legs 1424 in the furcation plug 1426. Directing a light into the optical fiber 1430 of one of the legs 1424 may illuminate the optical fiber 1416 of the cable 1410 and/or the furcation plug 1426. Furthermore, directing a light into the optical fiber(s) 1416 of the cable 1410 may illuminate the optical fibers 1430 of the legs 1424.

In contemplated embodiments, the optical fibers 1430 of each of the legs 1424 are configured to release different color light when illuminated. The optical fibers 1430 may be dyed or coated in different colors. With embodiments incorporating the translucent material 928 and configuration shown and discussed with regard to FIG. 9, the translucent material 928 may be dyed different colors. The color of light released by the optical fiber 1430 of the leg 1424 may correspond with the particular glass optical fiber or other transmission element carried interior to the leg 1424 and connected to the connector 1428. In other embodiments, other types of cables, such as cables 310, 410, 510, 610, 710, 810, 910, 1010, 1110, 1210, 1310, may be dyed or otherwise configured to release colored light corresponding to a protocol or coded system, where the cables 310, 410, 510, 610, 710, 810, 910, 1010, 1110, 1210, 1310 include more than one color tracer features and/or where different cables of the same type include different color tracer features.

Figure 15:
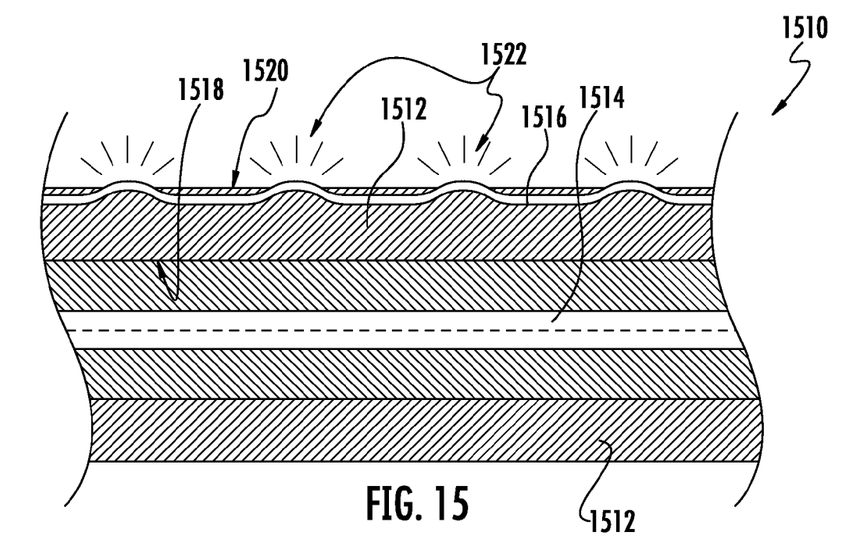
FIGS. 15-16 are side sectional views of fiber optic cables according to various exemplary embodiments.
Figure 16:
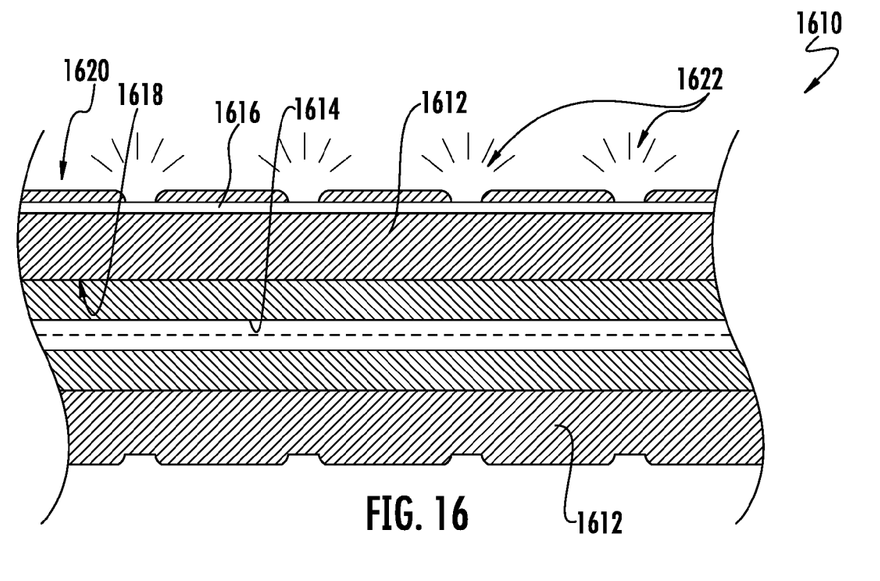

Referring to FIGS. 15-16, the fiber optic cables 1510, 1610 include the optical fibers 1516, 1616, which are at least partially embedded in the jacket 1512, 1612 of the respective cables 1510, 1610. In contemplated embodiments, the optical fibers 1516, 1616 may be configured to extend from or be directly exposed from the exterior surface 1520, 1620 of the jacket 1512, 1612 at discrete sections 1522, 1622 or points along the length of the respective fiber optic cables 1510, 1610. The discrete sections 1522, 1622 or points, where the optical fiber 1516, 1616 are exposed, may be uniformly spaced along the length of the fiber optic cables 1510, 1610.

According to an exemplary embodiment, the structural pattern of the jacket 1512, 1612 is intended to keep light within the optical fibers 1516, 1616 at locations along the respective cable 1510, 1610 where the optical fibers 1516, 1616 are not exposed, thereby increasing the distances that light may travel through the optical fibers 1516, 1616 without being attenuated. Accordingly, spacing of the points of exposure of the optical fiber 1516, 1616 is intended to increase the length of optical fiber 1516, 1616 that serves as a tracer feature for a given external source of light. In other embodiments, the thickness of material between the optical fiber 1516, 1616 and exterior surface 1520, 1620 of the jacket 1512, 1612 may vary to allow light to escape the jacket 1512, 1612 at discrete positions or intervals, but the optical fiber 1516, 1616 may not be fully exposed.

According to an exemplary embodiment, to operate the tracer feature, an operator directs visible-spectrum light into an optical fiber that is integrated with the exterior surface of the jacket. In some applications the operator may direct the light into the optical fiber from an end of the cable, such as directing the light directly into an open end of the optical fiber. The light then projects along the core to be released at one or more viewing locations on the corresponding cable to identify the cable. In some embodiments, the viewing location is at the opposite end of the cable only, while in other embodiments the viewing location(s) include the some or all of the length of the cable.

In contemplated embodiments, discrete lengths of optical fiber (e.g., greater than a meter, less than ten meters) are integrated with the exterior surface of a jacket of a longer fiber optic cable, such as cables 310, 410, 510, 610, 710, 810, 910, 1010, 1110, 1210, 1310, 1410, where the discrete lengths of optical fiber are positioned sequentially in series and/or in parallel with one another longitudinally along the length of the respective cable. Light directed into the optical fiber primarily illuminates only the discrete length. An operator can identify and follow a particular cable by lighting one of the discrete lengths of optical fiber and following that optical fiber to the next discrete length, lighting that next discrete length of optical fiber, and continuing the process until reaching a desired position on the cable, such as an end of the cable.

In other embodiments, the second optical fiber continuously runs the whole length of the cable, such as for thousands of meters.

In some such contemplated embodiments, lateral cross-sections on ends of the discrete lengths of optical fiber may be exposed to improve receipt of light from external sources into the discrete lengths of optical fiber (see generally FIGS. 7-8). The discrete lengths of optical fiber may be extruded with the jacket or separately attached, and may be plastic optical fibers or glass optical fiber configured to scatter light passing therethrough in a controlled manner corresponding to a greater attenuation of visible light than glass optical fibers extending through the interior of the respective cable.

According to an exemplary embodiment, the tracer feature of the fiber optic cable does not include an active light-producing component (e.g., chemical reaction, LED, etc.), but instead the tracer feature includes a passive light-carrying optical fiber. Light produced and provided external to the tracer feature by a separate light source, such as a flashlight, handheld light-emitting diode, laser pointer, or other portable light source is then directed into the optical fiber integrated with the exterior of the jacket to provide a visual trace of the associated cable. In other contemplated embodiments, connectors or other components of associated fiber optic assemblies may include integrated light sources, such as LED- or semiconductor laser-sources, that direct light into the optical fibers to provide a visual trace of the associated fiber optic cables.

Figure 17:
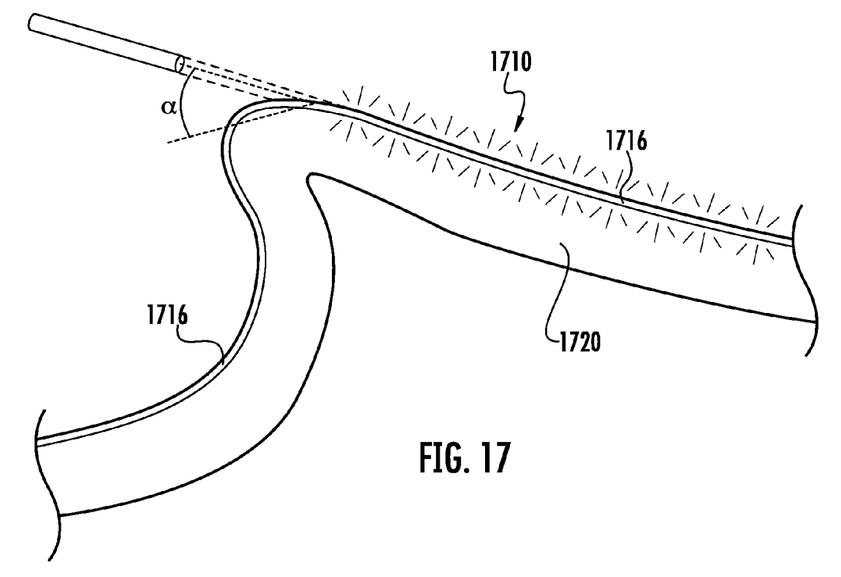
FIG. 17 is a perspective view of an external light source and a fiber optical cable according to an exemplary embodiment.

Referring now to FIG. 17, an optical fiber 1716 integrated with the exterior surface 1720 of the fiber optic cable 1710 is configured to receive and transmit light that is supplied to the optical fiber 1716 from locations on the cable 1710 other than just the ends of the cable 1710, such as some or any position along the length of the cable 1710. An operator directs light into the optical fiber 1716 at an angle a, relative to the length of the optical fiber 1716, that is sufficient to allow some or all of the light to pass through the cladding and into the core of the optical fiber 1716. Such an angle a may be facilitated by bending the cable 1710. The materials of the cable 1710 and optical fiber 1716 integrated with the exterior surface 1720 may be selected and positioned to allow bending to achieve the angle a, so that the optical fiber 1716 receives light along the length of the cable 1710, without over-bending the glass optical fibers or other transmission elements carried internally by the cable 1710 (e.g., greater than the minimum bend radius of corresponding glass optical fiber transmission elements).

Figure 18:
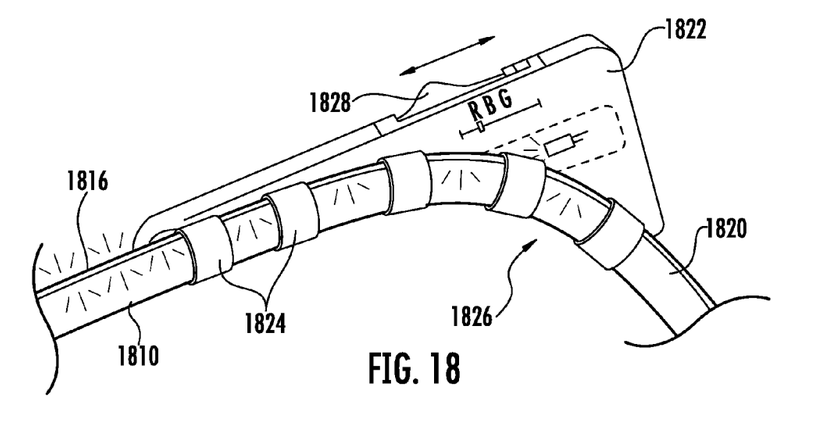
FIG. 18 is a perspective view of a lighting device and a fiber optic cable according to an exemplary embodiment.

Referring to FIG. 18, a stand-alone device 1822 (e.g., hands-free device) may be used to illuminate a fiber optic cable 1810 via an optical fiber 1816 integrated with the exterior surface 1820 (e.g., jacket exterior) of the optical fiber 1810. The device 1822 may be attached to the cable 1810, such as with clips 1824, straps, or other releasable fasteners. In some embodiments the device 1822 includes a curved channel 1826 configured to orient the optical fiber 1816 to receive light provided by the device 1822. In some embodiments, the device 1822 includes an LED-, laser-, or other light source 1828 that supplies light to the optical fiber 1810, which may direct the light into the optical fiber 1816 at the bend.

According to an exemplary embodiment, the device 1822 includes an on/off switch 1828, button, toggle, etc. The device 1822 may include a toggle with corresponding filters or controls that change the intensity of different color LEDs (e.g., red-green-blue (RGB)), to change the color of light emitted into the optical fiber 1816 so that the optical fiber 1816 releases a particular color light for tracing the corresponding fiber optic cable 1810. Two or more of such devices 1822 may be used together by an operator to identify multiple cables 1810 of interest, or to illuminate a longer length of the same cable 1810 (e.g., the devices may be attached in series or in succession along the cable 1810, where placement of the subsequent device 1822 may be guided by light provided by the prior device 1822). Separate devices 1822 could be set to provide light of different colors to highlight several different cables at once.

The construction and arrangements of the visual tracer systems and methods, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings, features, and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fiber optic cable, comprising:
   a first optical fiber comprising a glass core and cladding, wherein the glass core is configured to provide controlled transmission of light through the fiber optic cable for high-speed data communication;
   a jacket having an interior surface that defines a conduit through which the first optical fiber extends, and further having an exterior surface that defines the outside of the fiber optic cable; and
   a second optical fiber that is integrated with the exterior surface of the jacket,
   wherein second optical fiber is integrated with the exterior surface of the jacket such that when the jacket is bent to an angle, the second optical fiber is oriented at the bend to receive light provided by an external light source directed toward the second optical fiber for transmission of the light by the second optical fiber,
   wherein the angle corresponds to a bend radius that is greater than the minimum bend radius of the first optical fiber, and
   wherein the second optical fiber has at least twice the attenuation of visible light of the first optical fiber.

2. The fiber optic cable of claim 1, wherein jacket is configured to allow orientation of the second optical fiber to receive light provided by the external light source at any position along the length of the jacket.

3. The fiber optic cable of claim 1, wherein the second optical fiber is helically wound around and integrated with the exterior surface of the jacket.

4. The fiber optic cable of claim 1, wherein structure of the jacket keeps light within the second optical fiber at locations along the cable where the second optical fiber is not exposed, thereby increasing the distances that light may travel through the second optical fiber without being attenuated.

5. A method of manufacturing a cable, comprising:
   extruding a jacket to surround a first optical fiber comprising a glass core and cladding, wherein the glass core is configured to provide controlled transmission of light through the cable for high-speed data communication; and
   winding around and integrating a second optical fiber with an exterior surface of the jacket, wherein the optical fiber is configured to release, along a length of the second optical fiber, at least some of light passed through the second optical fiber such that the released light is visible along the exterior surface of the jacket, thereby providing a visual trace, wherein positioning of the second optical fiber facilitates view-ability of the second optical fiber without regard to orientation of the cable and mitigates stresses on the second optical fiber when the cable is in bending,
   wherein the second optical fiber is plastic, and wherein the extruding step further includes co-extruding the second optical fiber with the jacket such that the second optical fiber is at least partially embedded in the jacket and is extruded with a round cross section.

6. The method of claim 5, wherein the plastic of the second optical fiber is a single material, and wherein the material of the jacket has a lesser index of refraction than the plastic of the second optical fiber such that the material of the jacket serves as cladding for the second optical fiber.

7. The method of claim 5, wherein the second optical fiber is helically wound around and integrated with the exterior of the jacket.

8. The method of claim 7, wherein the second optical fiber is one of two or more second optical fibers helically wound around the exterior surface of the jacket.

9. The method of claim 8, wherein the second optical fibers are wound in the same direction.

10. The method of claim 8, wherein the second optical fibers are counter-helically wound to crisscross one another.

11. The method of claim 5, further comprising a rotating feeder distributing material of the second optical fiber.

12. A fiber optic cable, comprising:
    a first optical fiber comprising a glass core and cladding, wherein the glass core is configured to provide controlled transmission of light through the fiber optic cable for high-speed data communication;
    a jacket having an interior surface that defines a conduit through which the first optical fiber extends, and further having an exterior surface that defines the outside of the fiber optic cable; and
    a second optical fiber that is integrated with the exterior surface of the jacket,
    wherein second optical fiber is integrated with the exterior surface of the jacket such that when the jacket is bent to an angle, the second optical fiber is oriented at the bend to receive light provided by an external light source directed toward the second optical fiber for transmission of the light by the second optical fiber, and
    wherein thickness of material between the second optical fiber and the exterior surface of the jacket varies along the length of the cable to allow light to escape the jacket from the second optical cable at discrete positions or intervals.

13. A fiber optic cable, comprising:
    a first optical fiber comprising a glass core and cladding, wherein the glass core is configured to provide controlled transmission of light through the fiber optic cable for high-speed data communication;
    a jacket having an interior surface that defines a conduit through which the first optical fiber extends, and further having an exterior surface that defines the outside of the fiber optic cable; and a second optical fiber that is integrated with the exterior surface of the jacket, wherein second optical fiber is integrated with the exterior surface of the jacket such that when the jacket is bent to an angle, the second optical fiber is oriented at the bend to receive light provided by an external light source directed toward the second optical fiber for transmission of the light by the second optical fiber, and wherein the second optical fiber is one of a plurality of second optical fibers, each of discrete lengths greater than a meter and less than ten meters that are integrated with the exterior surface of the jacket of the fiber optic cable, wherein the discrete lengths of second optical fibers are positioned sequentially in at least one of in series and in parallel with one another longitudinally along the length of the cable, wherein light directed into one of the second optical fibers primarily illuminates only that particular one of the second optical fibers, whereby an operator may identify and follow the cable by lighting one of the discrete lengths of the second optical fibers and following that second optical fiber to the next discrete length, lighting that next discrete length of the second optical fibers, and continuing the process until reaching a desired position along the cable such as an end of the cable.

* * * * *